United States Patent [19]

Noguchi et al.

[11] 4,186,481
[45] Feb. 5, 1980

[54] METHOD FOR FABRICATION OF REAR CHIP FOR HALL EFFECT MAGNETIC HEAD

[75] Inventors: Takaharu Noguchi; Takao Ketori; Kohji Tamura, all of Yokohama; Tetsu Oi, Tokyo; Yutaka Miyoshi, Katsuta, all of Japan

[73] Assignee: Hitachi, Ltd., Japan

[21] Appl. No.: 939,210

[22] Filed: Sep. 5, 1978

[30] Foreign Application Priority Data

Sep. 5, 1977 [JP] Japan .................... 52-105824

[51] Int. Cl.² ............................... G11B 5/42
[52] U.S. Cl. ..................... 29/603; 360/112
[58] Field of Search ............ 29/603; 360/112, 113, 360/125-127

[56] References Cited

U.S. PATENT DOCUMENTS 3,943,570  3/1976  Yamamoto et al. ............ 360/112

Primary Examiner—Carl E. Hall
Attorney, Agent, or Firm—Craig and Antonelli

[57] ABSTRACT

A method for fabricating a rear core for the magnetic circuit of a Hall effect magnetic head is disclosed. The bottom size of the rear core protrusion is made substantially equal to the size of a Hall element. A gap is provided between the Hall element and the rear core. In order to minimize the gap, the rear core block is provided with supports for fabrication, whereby the gap between the Hall element and the bottom protrusion of the rear core is positioned accurately. The supports are removed at the end of fabrication. The bottom protrusion of the rear core prevented pressure from being applied to the Hall element, thus improving the sensitivity of the Hall effect magnetic head without increasing noises.

1 Claim, 10 Drawing Figures (REAR CHIP MASTER BLOCK SHOWN IN FIG. 8)

METHOD FOR FABRICATION OF REAR CHIP FOR HALL EFFECT MAGNETIC HEAD

FIELD OF THE INVENTION

This invention relates to a method of fabricating a rear chip for improving the sensitivity of the Hall effect magnetic head and reducing noises thereof.

DESCRIPTION OF THE PRIOR ART

The Hall effect element is increasingly valued as a magnetic head for audio purposes, firstly, for the reason that the semiconductor Hall effect with response to magnetic fluxes and short relaxation time of the current carriers is utilized, resulting in superior frequency characteristics in operation, and secondly, for the reason that the recent advance in the semiconductor technology makes it possible to reduce the size further.

Figure 1:
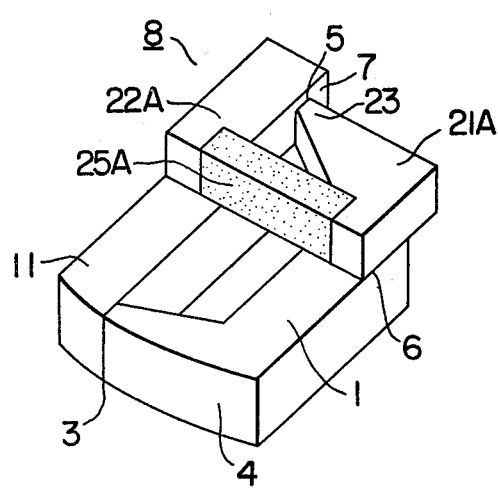
FIG. 1 is a perspective view schematically showing the construction of the magnetic circuit for the Hall effect magnetic head.

A perspective view of the magnetic circuit making up a Hall effect magnetic head is schematically shown in FIG. 1. A rear chip 8 comprises a rear core 21A, a rear core substrate 22A, a Hall element 7 arranged in opposed relation to a protrusion 23 of the rear core 21A on the rear core substrate 22A, and a member of non-magnetic material 25A for holding the relative positions of each component. A rear gap 5 is formed between the rear core protrusion 23 and the Hall element 7. The Hall effect magnetic head is completed by coupling the rear chip 8 of the above-mentioned construction to the front cores 1 and 11 at the coupling interface 6. Numeral 3 shows a front gap, and numeral 4 the surface to be brought into contact with the magnetic tape.

Figure 2:
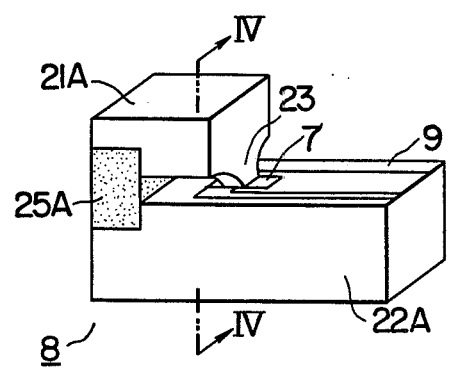
FIG. 2 is a perspective view showing the construction of a conventional rear chip for the Hall effect magnetic head.

In this rear chip 8, as obvious from the construction diagram of FIG. 2, the Hall element 7 is formed on the rear core substrate 22A, and the rear core 21A is disposed in precise positional relation with the rear core substrate 22A through the member of non-magnetic material 25A in such a manner that the bottom of the rear core protrusion 23 is opposed to the Hall element 7.

Figure 3:
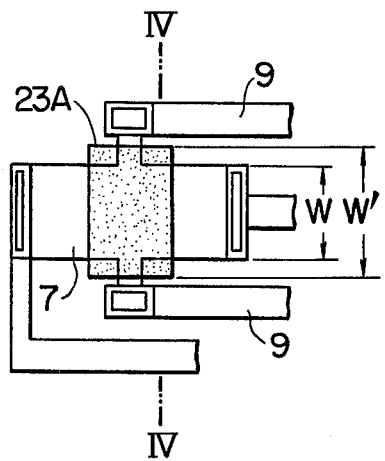
FIG. 3 is a diagram showing the positional and dimensional relations between the Hall element and the protrusion of the rear core.
Figure 4:
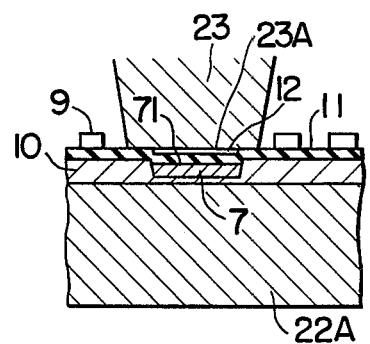
FIG. 4 is a sectional view taken along the line IV—IV in FIGS. 2 and 3.

The relation between the rear core protrusion 23 and the Hall element 7 is such that, as shown in FIG. 3, the bottom 23A of the rear core protrusion 23 which has a larger area than the Hall element 7 is placed in proximity to the Hall element 7. Referring to the general arrangement, as shown by FIG. 4 which is a sectional view taken along the line IV—IV in FIGS. 2 and 3, the bottom 23A of the rear core protrusion 23 is in contact with the insulating layer 11 of glass material and is opposed to the Hall element 7 through the rear gap 5 including the insulating layer 11 and the gap 12.

Figure 5:
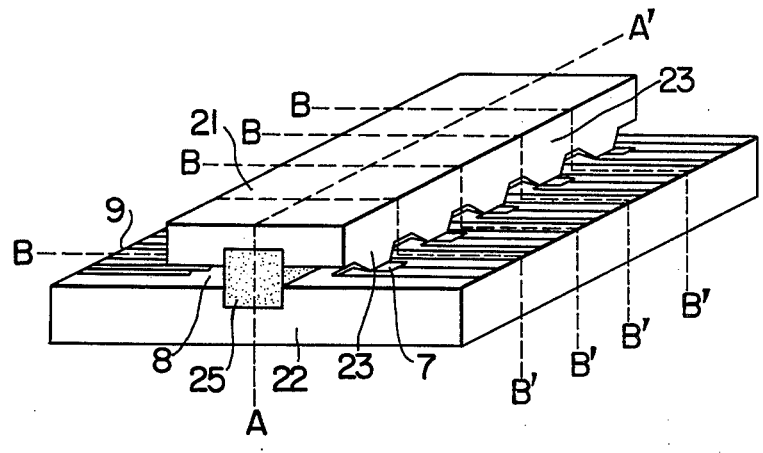
FIG. 5 is a perspective view showing the construction of a rear chip master block which is cut into the rear chip shown in FIG. 2.

A method of fabricating the master block will be briefly explained with reference to FIG. 5. First, a silicon dioxide ($SiO_2$) film is formed on the rear core substrate block 22 made of a ferromagnetic material such as ferrite, followed by formation of recesses each as large as the Hall element 7. The Hall element 7 is embedded in each recess and lapped to predetermined depth. The insulating film 11 and the terminal conductor 9 are formed. The rear core block 21 is arranged on the rear core substrate block 22 through the non-magnetic member 25. In the process, each rear core protrusion 23 and each Hall element 7 are fixedly arranged in opposition to each other. The master block as shown in FIG. 5 is now formed. The conventional rear chip 8 shown in FIG. 2 is made by cutting the master block along the line A–A' and lines B–B' in FIG. 5.

In the Hall effect magnetic head fabricated by the above-mentioned steps, the Hall element 7 and the peripheral portion 10 of high-purity glass material of the Hall element have a difference in hardness and therefore a difference in height occurs therebetween at the time of lapping. The width W' of the rear core protrusion 23 opposed to the Hall element surface 71 is 1.3 to 1.5 times larger than the width W of the control current terminal near a Hall output terminal of the Hall element 7 in order to reduce the pressure on the Hall element 7. The result is that the gap between the bottom 23A of the rear core protrusion 23 and Hall element surface 71 and the difference in area between the opposed surfaces thereof are enlarged, thereby leading to the disadvantage of a lower sensitivity of the magnetic head using a rear chip of such a construction.

In the case where the bottom rear of the rear core protrusion 23 is decreased and the rear gap is shortened, on the other hand, the rear core block 21 is pressure-bonded to the rear core substrate 22 through the non-magnetic material member 25. As a result, the bottom 23A of the rear core protrusion 23 falls into the recess of the insulating film 11 opposed to the Hall element 7, so that the rear core protrusion 23 applies pressure to the Hall element 7, thus increasing the noises.

SUMMARY OF THE INVENTION

The present invention obviates the above-mentioned disadvantages of the prior art and provides a method for fabricating a rear chip for the Hall effect magnetic head high in S/N (signal-to-noise ratio) and sensitivity.

In order to achieve the above-mentioned object, according to the present invention, there is provided a method for fabricating a rear chip for the Hall effect magnetic head, in which a rear core block having a multiplicity of rear core protrusions and a multiplicity of rear core supports is secured, through a member of non-magnetic material, on a rear core substrate block embedded with a multiplicity of Hall elements in predetermined relative positions. In the process, the width of the bottom of each rear core protrusion is made substantially made equal to the width of the control current terminal near the Hall output terminal of each Hall element. Thus a composite block is formed in which the bottom of the rear core protrusion and the Hall element opposed to each other are not under pressure due to the supports. This block is cut and the rear core supports are removed, thus fabricating a multiplicity of rear chips.

DESCRIPTION OF THE PREFERRED EMBODIMENTS

Before explaining the embodiments of the method for fabricating the rear chip for the Hall effect magnetic head according to the present invention, the construction of a rear chip according to the present invention will be described.

Figure 6:
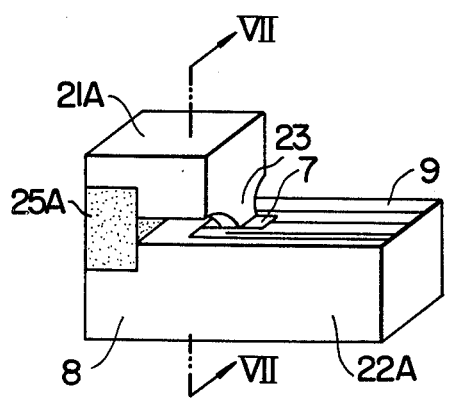
FIG. 6 is a perspective view showing the construction of a rear chip according to the present invention.

The diagram of FIG. 6 shows a perspective view of the construction of a rear chip for the Hall effect magnetic head according to the present invention. In the drawing, like reference numerals denote like component elements in FIG. 2.

This rear chip is such that the width W of the control current terminal near the Hall output terminal of the Hall element 7 is 0.2 mm, and the width W' of the bottom of the rear core protrusion 23 opposed to the Hall element is also 0.2 mm. The sectional area of the opposed bottom of the rear core protrusion 23 is 0.03 mm$^2$.

Figure 7:
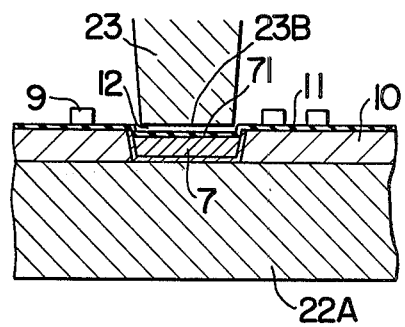
FIG. 7 is a diagram for explaining the positional relation between the Hall element and the rear core protrusion of the rear chip according to the present invention with reference to the section taken along the line VII—VII in FIG. 6.

The sectional view taken at line VII—VII in FIG. 6 is shown in FIG. 7 for explaining the arrangement and configuration of the rear core protrusion 23 and the Hall element 7 in comparison with the prior art shown in FIG. 4. In the conventional rear chip 8, the width of the bottom of the rear core protrusion is larger than the width of the Hall element, and therefore the magnetic flux-focusing effect is reduced by the difference in area.

In contrast, the rear chip according to the present invention shown in FIG. 7 is so constructed that the width W' of the bottom 23B of the rear core protrusion 23 is the same as the width W of the Hall element 7, so that the effect of magnetic flux focusing is approximately ideal. Thus it will be understood that the sensitivity of the Hall element 7 is improved over the conventional devices.

A method for fabricating a rear chip for the Hall effect magnetic head which is constructed as mentioned above will be described below with reference to FIGS. 8 and 9 for overcoming the disadvantages of the conventional devices.

Figure 8:
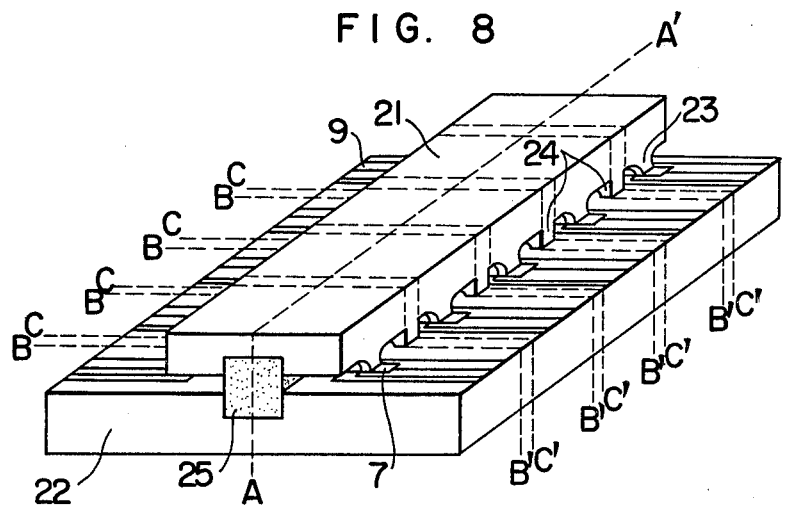
FIG. 8 is a perspective view showing the construction of a rear chip master block from which the rear chip shown in FIG. 6 is to be produced.

A perspective view of the construction of a master block containing a plurality of rear chips formed by the method according to the invention is shown in FIG. 8.

When the block is cut along the lines A–A', B–B' and C–C' in FIG. 8, the rear core supports 24 are removed and the rear chip as shown in FIG. 6 is produced. The difference in construction between the rear chip according to the present invention and the conventional rear chips will be easily understood by comparing the sectional views showing the constructions thereof respectively in FIGS. 7 and 4. In FIG. 7, a recess similar to that provided in the conventional device is formed on the insulating film 11 for the Hall element 7. The width of the bottom 23B of the rear core protrusion 23 is substantially the same as that of the Hall element 7, and therefore the bottom 23B is substantially flush with the upper surface of the insulating film 11. No pressure, however, is applied to the Hall element 7 in view of the fact that the supports 24 used in the processes of fabrication act to produce the gap 12 between the bottom 23B and the Hall element 7. Thus the area of the bottom 23B of the rear core protrusion 23 is made substantially equal to that of the Hall element without any pressure applied to the Hall element 7, with the result that the sensitivity of the rear chip is improved over that of the conventional rear chips without increasing the noises.

A method for fabricating the master block for the rear chips according to the present invention shown in FIG. 8 will be explained below with reference to FIGS. 9A and 9B. The diagram of FIG. 9A shows steps for fabrication of a rear core substrate block carrying Hall elements, and FIG. 9B steps of fabricating a rear core block.

Figure 9A:
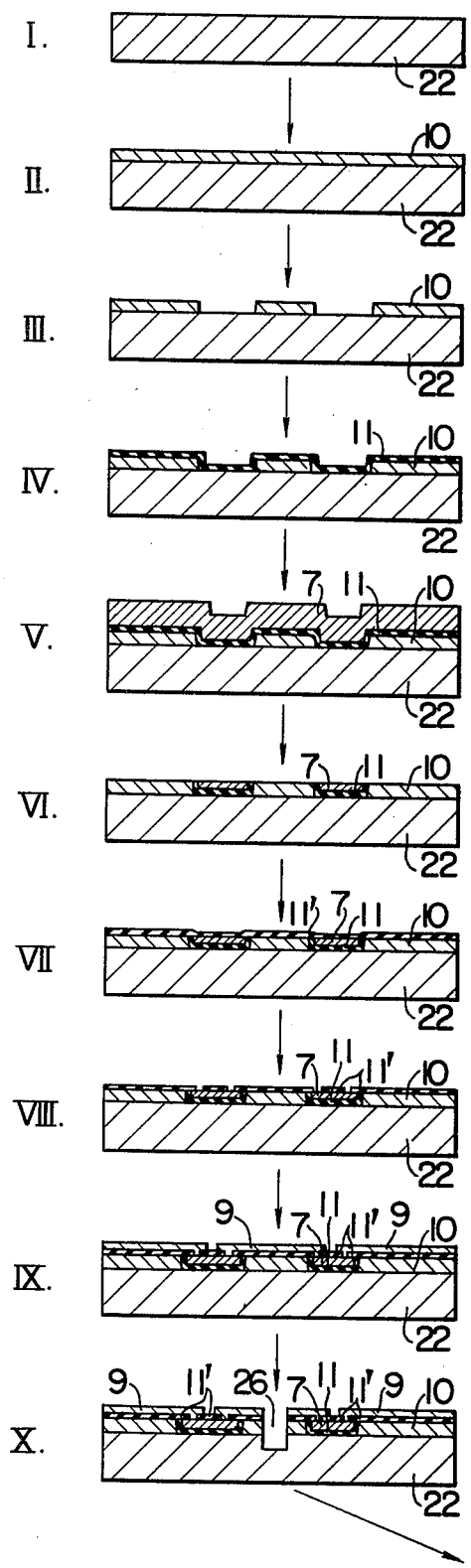
FIG. 9A is a diagram for explaining the steps of fabricating the rear core substrate block for the rear chip of the Hall effect magnetic head according to the present invention.

In FIG. 9A, the surface of the rear core substrate block 22 made of ferrite of manganese-zinc (MnZn) is ground very smoothly as a first step. In the second step, a silicon dioxide film approximately 1.7 $\mu$m thick is formed by the well-known sputtering process on the rear core substrate block 22. The third step consists in forming in the silicon dioxide film 10 a substantially rectangular hole in the size of 0.2 mm by 0.7 mm sufficient to contain the entire Hall element 7, by the well-known photo-etching process. In the fourth step, in order to complement the insulation ability of the surface of the ferrite substrate exposed at the hole bottom, the high-purity glass 11 0.3 $\mu$m thick is formed by the well-known sputtering process. As the fifth step, a semiconductor film 7 of an indium-antimony (InSb) compound is formed to the thickness of 7 $\mu$m to 8 $\mu$m by the well-known three-temperature (vapor-deposition) method by use of a vapor-deposition source including high-purity indium and antimony. At the same time, the assembly is heat-treated for enlarging the crystal grains. The sixth step includes the grinding of the semiconductor film of the InSb compound to the thickness of 1.4 $\mu$m by a well-known grinding process. By the last-mentioned step, the Hall element 7 is substantially completed. In this step, in order to remove the layer distorted by the previous treatments and remaining in the surface of the Hall element 7, only the Hall element 7 is selectively etched by the thickness of 0.4 $\mu$m by a well-known process.

As the seventh step, high-purity glass 11' as thick as 0.3 $\mu$m is formed by the well-known sputtering process as in the fourth step.

This is followed by the eight step in which connecting holes are fomed by the well-known photo-etching process at predetermined positions of the Hall element corresponding to the electrodes thereof. As the ninth step, a wiring aluminum film is formed by the well-known aluminum vapor-deposition process, followed by the forming of a wiring conductor pattern 9 of an aluminum film for the Hall element 7 by the well-known photo-etching process. In that tenth step, a groove 26 fitted with the non-magnetic material member 25 is formed by the well-known outer (blade) cutter.

By the first to tenth steps shown in FIG. 9A, the rear core substrate block 22 is completed.

Figure 9B:
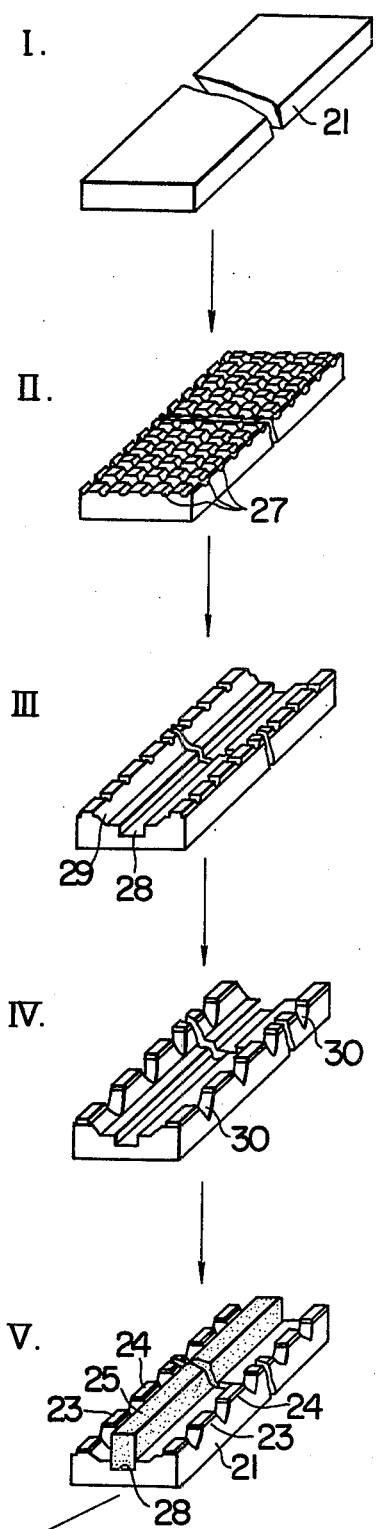
FIG. 9B is a diagram for explaining the steps of fabricating the rear core block.

The diagram of FIG. 9B is for explaining the steps of fabricating the rear core block 21. In the first step, the surface of the rear core block 21 of MnZn ferrite is ground to make it very flat. In the second step, slits 27 are formed by the well-known wire saw for forming protrusions which snugly fit the Hall elements 7 respectively in FIG. 9A. As the third step, a groove 28 where the non-magnetic material member 25 is to be fitted and the path of the magnetic fluxes of the magnetic circuit which finally makes up the rear core are formed. In the drawing under consideration, an assembly including several Hall elements 7 is shown. In this step, an outer blade cutter with teeth tapered by 45 degrees and two ordinary outer periphery slicers with different tooth thickness are used to form the shown slits through four substeps. The assembly designated by the step III is produced in this way.

The fourth step is one in which supports 24 for the rear core blocks 21 and the rear core protrusions 23 according to the present invention are formed. By use of the outer blade cutter with teeth tapered by 45 degrees which was employed in the third step, the supports 24 and the rear core protrusions 23 are formed alternately at predetermined intervals of space by reference to the slits formed by the wire saw in the third step.

In the fifth step, the non-magnetic material member 25 is fitted in the assembly thus far completed up to the fourth step. The non-magnetic material member 25 is suitably made of nickel-zinc (NiZn) ferrite or glass material. As illustrated, the non-magnetic material member 25 is required to be fitted with such a precision that no play is permitted in the groove 28. By taking the steps shown in FIG. 9B, the rear core block 21 is completed.

Next, the semi-finished product obtained through the ten steps in FIG. 9A is coupled to the semi-finished product produced through the five steps in FIG. 9B in such a manner that the non-magnetic material member 25 of the latter is fitted in the groove 26 of the former. At the same time, the gap 12 between each Hall element 7 and the bottom 23A is precisely adjusted by the supports 24, and then both blocks are secured to each other by a bonding agent. Thus the master block for rear chips shown in FIG. 8 is completed.

Generally, the output of a Hall element is proportional to the density of magnetic fluxes applied thereto. If the sectional area of the conventional rear core protrusion is reduced from 0.045 mm$^2$ to 0.03 mm$^2$, therefore, the density of magnetic fluxes is increased by about 1.5 dB even after allowing for the reduction in the amount of magnetic fluxes from the tape. Using a magnetic head with the rear core chip according to the present invention coupled to the front cores as shown in FIG. 1, the tape playback output was measured (at the tape recording density of 250 pWb/m, 333 Hz). As a result, it was found that the sensitivity was increased by about 1 dB as compared with the conventional rear cores. It was also confirmed that although the noises are increased by about 3 dB in the conventional method of assembly of the rear chip, the rear chip produced by the method according to the present invention is not accompanied by any increase in noises. Further, the bonding strength of the rear chip according to the invention is substantially the same as that of the conventional chips, so that the rear chip according to the invention is capable of enduring sufficiently the pressure applied when coupled with the front cores.

It will thus be understood from the foregoing description that by employing the method of fabrication of a rear core chip according to the present invention, a magnetic head with a Hall element is produced which is improved in sensitivity without any increase in noises.

We claim:

1. In a method for fabricating a rear chip for a Hall effect magnetic head, comprising steps of producing a rear core substrate block with a multiplicity of Hall elements embedded therein in predetermined spacial relation to each other, producing a rear core block with a multiplicity of rear core protrusions, securing said rear core block onto said rear core substrate block through a member of non-magnetic material in such a manner that said rear core protrusions are in opposed relation with said Hall elements respectively, and cutting into a multiplicity of rear chips the assembly including said rear core substrate block and said rear core block; the improvement further comprising steps of forming a plurality of rear core supports between said rear core protrusions respectively in such a manner that the bottoms of said rear core supports are in the same plane as the bottoms of said rear core protrusions, securing said rear core block to said rear core substrate block in such a manner that the width of the bottom of each of said rear core protrusions is substantially equal to the width near a Hall output terminal of each of said Hall elements along the control current flow therein and that the bottom of each of said rear core protrusions is in opposed relation to each of said Hall elements, said rear core supports preventing any pressure from being applied to said Hall elements, and removing said rear core supports.

* * * * *